Dec. 1, 1953
K. O. I. STYRÉN ET AL
2,661,395
VARIABLE RESISTANCE SIGNALING SYSTEM
Filed Nov. 2, 1949
2 Sheets-Sheet 1

INVENTORS
KNUT OLOF IVAR STYREN
HAROLD JEFFERSSON
BY Leech & Radue
ATTORNEYS

Dec. 1, 1953 K. O. I. STYRÉN ET AL 2,661,395

VARIABLE RESISTANCE SIGNALING SYSTEM

Filed Nov. 2, 1949 2 Sheets-Sheet 2

INVENTORS
KNUT OLOF IVAR STYRÉN
HAROLD JEFFERSSON

BY Leech & Radue
ATTORNEYS

Patented Dec. 1, 1953

2,661,395

UNITED STATES PATENT OFFICE 2,661,395

VARIABLE RESISTANCE SIGNALING SYSTEM

Knut Olof Ivar Styrén, Malarhojden, and Harold Jeffersson, Stockholm, Sweden, assignors to Telefonaktiebolaget L M Ericsson, Stockholm, Sweden, a company of Sweden Application November 2, 1949, Serial No. 125,146

7 Claims. (Cl. 179—16)

The present invention refers to emission of signals over a two-wire line, a resistance being connected on the sender side in a circuit passing over said line, said circuit comprising on the receiver side a source of direct current for feeding the circuit, a receiving device and an adjustable impedance. In such known signal systems the line loop is comprised in a balance- or bridge-connection and a compensating resistance comprised in the connection on the receiver side is regulated by a resistance being connected in on the sender side when the balance is disturbed, the magnitude of the regulation indicating the value of the signal.

Such systems exist within automatic telephone systems, the resistance of the line usually varying from case to case. It is known to set before the beginning of the emission a resistance arranged in series with the line coil so that the current intensity on the line attains a fixed value and to change said resistance at each signal so that the balance is maintained in the connection, the current intensity on the line being kept constant at the fixed value. Such a balancing takes however a very long time, because of which such systems have not been much used.

The present invention is characterized by the receiving device feeling the magnitude of the change of voltage caused over the line by a signal after the current intensity has been set to the fixed value. A registration in a registering device corresponding to the said magnitude is sometimes desirable.

Figure 4:
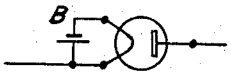
Figure 6:
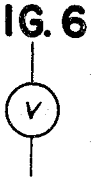
Figure 1:
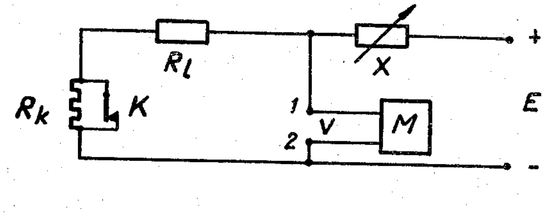
Figure 2:
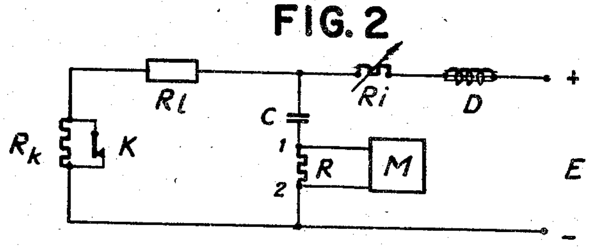
Figure 3:
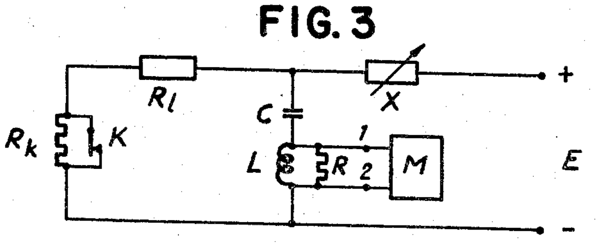
Figure 8:
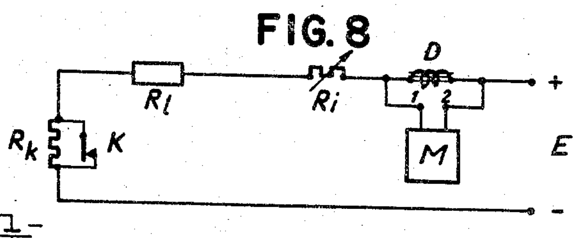
Figure 5:
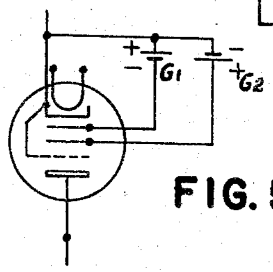
Figure 7:
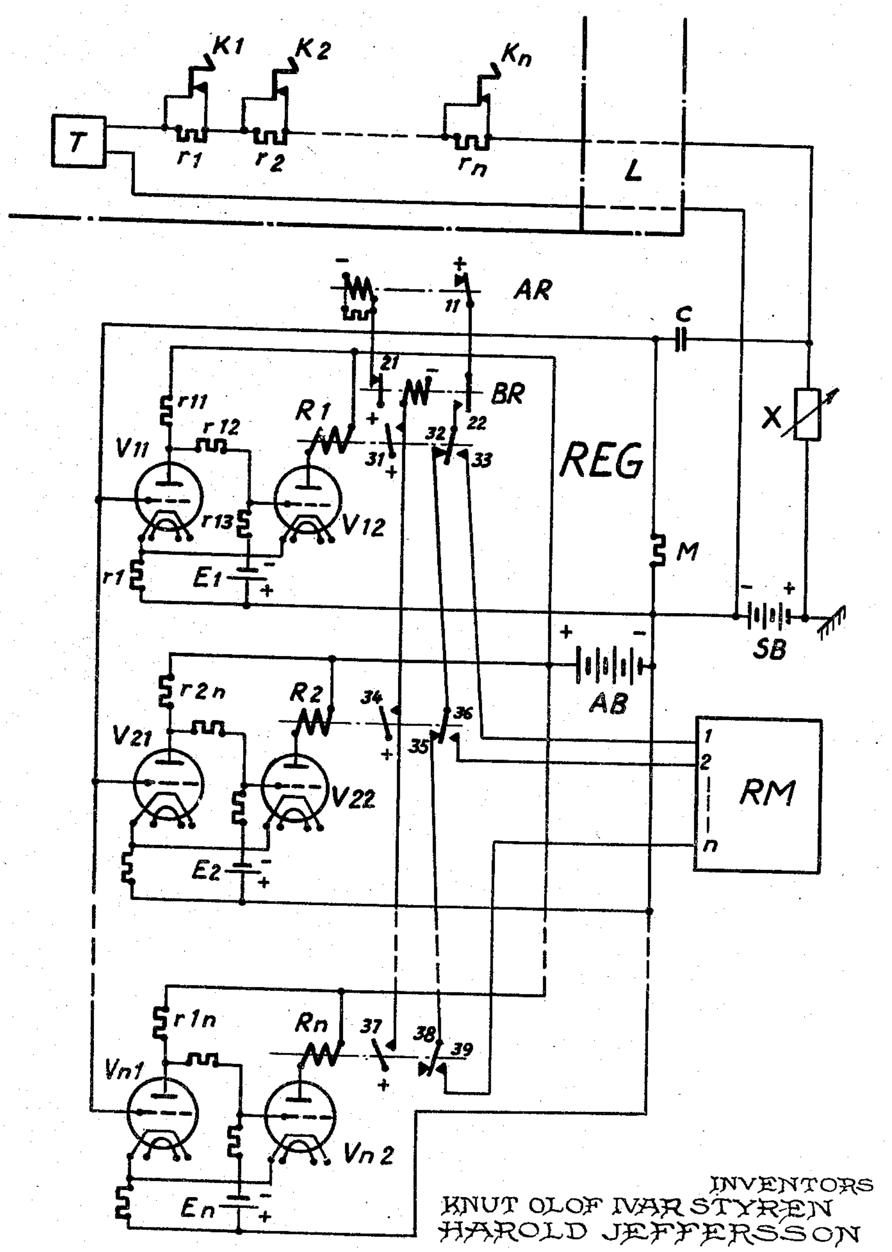

The accompanying drawings Figs. 1–3 show in principle how a measuring device according to the invention can be made. Fig. 4 illustrates a saturated diode which may be substituted in any of Figures 1, 2, 3, 7 and 8 for the element marked X or $R_1$. Fig. 5 shows a pentode which may be similarly substituted, and Fig. 6 shows a voltmeter which in any of the Figures 1, 2, 3, 7 and 8 may be substituted for the measuring or registering device M or RM. Fig. 7 shows an application of the invention for setting of a register in an automatic telephone system by means of key sets and Fig. 8 illustrates an arrangement in which all of the parts are in a series circuit.

The invention can be used for signal transmission for remote measuring with or without requirements for speed. The line is then for example connected in series with a thermistor regulating the current intensity on the line to a fixed value. The arrangement is shown in Fig. 1, where RL represents the line resistance, X an adjustable impedance, for example a thermistor, and RK a resistance, which can be connected in the sender side of the line by a contact device K.

E is a source of potential and M a receiving device. The voltage over the terminals 1—2 of the receiving device M are designed by V. The change that voltage V is subject to when the resistance $Rk$ is connected by break of the contact K in the figure is designated by $v$. If the impedance X changes its value so that the current intensity remains constant, we obtain $$v = I.Rk$$

where $I$ = a constant indicating the value of the current intensity of the line.

The change of voltage $v$ then becomes proportional to the resistance $Rk$ independent of the line resistance $Rl$ and the battery voltage E. By measuring the change of voltage at the terminals 1—2, the resistance $Rk$ and a signal corresponding to $Rk$ can thus be determined. Since a thermistor does not change its resistance immediately, it can suitably be exchanged to a saturated diode such as illustrated in Fig. 4 or a pentode such as shown in Fig. 5 or be connected in series with a large inductance according to Fig. 2, if quick measuring processes are desired. The most simple receiving device is a voltmeter as seen in Fig. 6 which can be substituted for M in Figs. 1, 2, 3 and 8, the changes of which are observed. Another method of measuring the change of voltage over the line is achieved by connecting a condenser C in Figs. 2–3 in series with a resistance R, which is connected in parallel with the receiving device M. A current impulse is thus obtained through the resistance R and the voltage drop over the resistance R will in the first moment be equal to the change of voltage $v$ over the line. A voltage impulse is obtained at the receiving device M and the maximal value of the voltage is noted on said receiving device.

Within automatic telephone systems impulses are the means of signalling and the devices according to Figs. 2, 3, 7 and 8 are suitable for such systems. Fig. 3 differs from Fig. 2 in that the resistance R has been connected in parallel with a choke coil L, a filter being obtained, which gives the impulse corresponding to the change of voltage $v$ a more suitable curve shape than the crest with slow damping, which characterizes a current impulse through the resistance R in Fig. 2.

Fig. 7 shows the application of the invention for setting of a register RM from a telephone T with key sets K1—K$n$ over a two wire line L fed from a battery SB over an adjustable impedance X. The impedance X automatically changes its resistance so that the current intensity on line L is chiefly kept constant at a fixed value. A condenser C is connected in series with a resistance M and parallel to the line L, The connection point between C and M is connected to the grid of the electron tubes V11—Vn1, each one of the anodes of which are connected partly to the battery AB over a resistance, e. g. r11, and partly to the grid for each of their other electron tubes V12, Vn2 over a resistance, for example r12. To each of the keys K1—Kn in the key set of the telephone instrument corresponds a resistance r1—rn, which is connected in the circuit over the resistance X when the key is actuated, and a pair of tubes V11—V12, V21—V22 to Vn1—Vn2. The pairs of tubes differ from each other only by the tubes V12—Vn2 having different positive grid bias due to the helping batteries E1—En. A circuit is closed from the positive pole of the battery AB over the resistances r11, r12 and r13, the battery E1 to the negative pole of the battery AB. The grid bias of tube V11 is kept negative through the drop of voltage in the cathode resistance r1 and the voltage drop in the resistance r11 allows a positive grid bias for the electron tube V12. The relays R1—Rn in the anode circuits for tubes V12, V22 to Vn2 are normally energized and actuate their contacts 31—33, 34—36 and respectively 37-39. The relay AR keeps its armature attracted and the contact 11 is closed.

When some of the keys K1—Kn are pushed down, an increase of the voltage between the line branches takes place on the receiver side and a current impulse passes through the condenser C over resistance M. The increase of voltage is at first wholly absorbed by resistance M, owing to which the grid bias for the tubes V11—Vn1 increases with a value proportional to the value of the resistance r1—rn corresponding to the pushed down key. The current intensity through the tubes V11—Vn1 increases and so does the voltage drop over the anode resistances r11—r1n. A change of voltage is thus obtained on the grids of tubes V12—Vn2. In dependence on the magnitude of the current impulse through the resistance M a number of relays R1—Rn become currentless and release their armatures. If we suppose that all the tubes V12—Vn2 receive a negative grid bias all the relays R1—Rn will release their armatures. The contacts 31—39 are actuated. Relay BR is energized. The contacts 21—22 are actuated. A circuit is closed during the release time for relay AR from the positive pole over the contacts 11, 22 and 33 and the wire 1 to the register RM, which can be a relay set or a cross bar switch or the like. The release time of relay AR is adjusted so that a suitable part of the voltage impulse over resistance M is included in the signal.

Another method for obtaining a voltage impulse the amplitude of which is proportional to the resistance connected on the sender side is shown in Fig. 8. The receiving device M is here connected in parallel with a choke coil D, which is connected in series with the line as in Fig. 2. The D. C. resistance of the choke coil can be unimportant and the receiving device can be the same as the electron tube connection in Fig. 7, only a suitable negative grid bias being required for the tubes V11—Vn1. A thermistor Ri sets a certain fixed current intensity in the line before the beginning of the signal emission. When the resistance Rk is connected by key K the voltage is increased over the choke coil D due to self induction with a value, proportional to the value of resistance Rk. This increase is equal to the change of voltage arising on the line at signalling.

We claim:

1. In a signalling system for automatic telephone exchanges, in combination, a sending station including a variable resistance and a key-set for selectively varying said resistance, a receiving station including measuring and registering means responsive to the magnitude of change of a voltage; a line joining the said stations; a source of potential and a device for holding the current therefrom substantially constant connected in series and to said line; said measuring and registering means being connected across the line; the voltage comprising the product of said constant current and the change of impedance in said device by a change in said variable resistance serving to operate said measuring and registering means.

2. In a signalling system for automatic telephone exchanges, in combination, a sending station including a variable resistance and a key-set for selectively varying said resistance; a receiving station including measuring and registering means responsive to the magnitude of change of a voltage; a line joining the said stations; a source of potential and a device for holding the current therefrom substantially constant connected in series and to said line; a constant resistance in series with a condenser connected across the line; said measuring and registering means being connected in parallel with said constant resistance; the voltage comprising the product of said constant current and the change of impedance in said device by a change in said variable resistance causing a current pulse through said constant resistance and said condenser; the resultant voltage pulse over said constant resistance operating said measuring and registering means.

3. In a signalling system as described in claim 1, said device consisting of an inductance having low direct current resistance.

4. In a signalling system as described in claim 2, said device consisting of a saturated diode.

5. In a signalling system as described in claim 2, said device consisting of a thermionic pentode.

6. In a signalling system as described in claim 2, said device consisting of a thermistor and said measuring means consisting of a voltmeter.

7. In a signalling system as described in claim 2, said device consisting of a thermistor and an inductance connected in series.

KNUT OLOF IVAR STYRÉN.
HAROLD JEFFERSSON.

References Cited in the file of this patent

UNITED STATES PATENTS

| Number | Name | Date |
|---|---|---|
| 1,337,715 | McQuarrie | Apr. 20, 1920 |
| 1,391,586 | Slough | Sept. 20, 1921 |
| 1,736,283 | Gardner | Nov. 19, 1929 |
| 1,883,613 | Devol | Oct. 18, 1932 |
| 2,002,219 | Dimond | May 21, 1935 |
| 2,131,589 | Halligan | Sept. 27, 1938 |
| 2,139,249 | Welch | Dec. 6, 1938 |
| 2,208,655 | Wright | July 23, 1940 |
| 2,250,100 | Hubbard | July 22, 1941 |
| 2,294,464 | Lamberty | Sept. 1, 1942 |
| 2,301,523 | Clay et al. | Nov. 10, 1942 |
| 2,308,637 | Babcock | Jan. 19, 1943 |
| 2,332,872 | Shann | Oct. 26, 1943 |
| 2,351,016 | Deakin | June 13, 1944 |
| 2,351,684 | Jansson | June 20, 1944 |
| 2,438,496 | Deakin | Mar. 30, 1948 |